US012763849B2

(12) United States Patent
Pulikkal Xavier et al.

(10) Patent No.: US 12,763,849 B2
(45) Date of Patent: Oct. 13, 2026

(54) MANAGING TERRESTRIAL AND NON-TERRESTRIAL NETWORKS

(71) Applicant: Cisco Technology, Inc., San Jose, CA (US)

(72) Inventors: Alwin Xavier Pulikkal Xavier, Tienen (BE); Solomon Ayyankulankara Kunjan, New Hill, NC (US); Steven Laurent Paul Loos, Ternat (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 239 days.

(21) Appl. No.: 18/792,809

(22) Filed: Aug. 2, 2024

(65) Prior Publication Data

US 2026/0039375 A1 Feb. 5, 2026

(51) Int. Cl.
*H04B 1/18* (2006.01)
*H04B 7/185* (2006.01)
*H04W 48/08* (2009.01)

(52) U.S. Cl.
CPC ........ *H04B 7/18519* (2013.01); *H04W 48/08* (2013.01)

(58) Field of Classification Search
CPC .. H04B 7/18519; H04W 48/08; H04W 48/17; H04W 48/16
USPC .......................................................... 455/427
See application file for complete search history.

(56) References Cited

U.S. PATENT DOCUMENTS

2021/0105693 A1 4/2021 Tripathi et al.
2021/0360493 A1* 11/2021 Shrestha ............ H04B 7/18541
2022/0070738 A1* 3/2022 Tripathi ................ H04W 28/24
2022/0248296 A1* 8/2022 Merwaday ............ H04W 48/18
2023/0269635 A1* 8/2023 Xu ........................ H04W 36/08 370/329
2025/0294497 A1* 9/2025 Shrivastava ....... H04B 7/18567
(Continued)

FOREIGN PATENT DOCUMENTS

WO 2022155177 A1 7/2022
WO 2023047336 A1 3/2023
(Continued)

OTHER PUBLICATIONS

3GPP: "3rd Generation Partnership Project, Technical Specification Group Radio Access Network, Solutions for NR to support non-terrestrial networks (NTN) (Release 16)", TR 38.821, V16.0.0, Dec. 2019, 141 Pages.
(Continued)

*Primary Examiner* — Peguy Jean Pierre
(74) *Attorney, Agent, or Firm* — Edell, Shapiro & Finnan, LLC

(57) ABSTRACT

Presented herein are techniques through which an Access and Mobility Management Function (AMF) may obtain location information for a plurality of terrestrial radio base stations and a plurality of non-terrestrial network (NTN) radio base stations. The AMF may obtain an indication of neighboring NTN radio base stations for each of the plurality of terrestrial radio base stations and store an NTN neighbor list that includes the indication of the neighboring NTN radio base stations for each of the plurality of terrestrial radio base stations. The AMF may perform one or more actions with respect to the NTN neighbor list and the GPS coordinates.

20 Claims, 12 Drawing Sheets

(56) References Cited

U.S. PATENT DOCUMENTS

2025/0380148 A1* 12/2025 Esswie .................. H04W 16/28

FOREIGN PATENT DOCUMENTS

WO 2023133023 A1 7/2023
WO 2023215599 A1 11/2023

OTHER PUBLICATIONS

3GPP: "3rd Generation Partnership Project, Technical Specification Group Radio Access Network, Solutions for NR to Support Non-Terrestrial Networks (NTN) (Release 16)", TR 38.821, V16.2.0, Mar. 2023, 140 Pages.
3GPP: "3rd Generation Partnership Project, Technical Specification Group Radio Access Network, Study on New Radio (NR) to Support Non-terrestrial Networks (Release 15)", TR 38.811, V15. 1.0, Jun. 2019, 126 Pages.
Barton R., et al., "Data Sovereignty and Data Residency Communications Involving Low Earth Orbit Satellites", Technical Disclosure Commons, Jul. 2022, 6 Pages.
ETSI: "5G, Procedures for the 5G System (5GS) (3GPP TS 23.502 Version 16.7.0 Release 16)", ETSI TS 123 502, V16.7.0, Jan. 2021, 607 Pages.
ETSI: "5G, System Architecture for the 5G System (5GS) (3GPP TS 23.501 Version 16.6.0 Release 16)", ETSI TS 123 501, V16.6.0, Oct. 2020, 450 Pages.
Ghosh A., et al., "5G Evolution: A View on 5G Cellular Technology Beyond 3GPP Release 15", IEEE Access, Sep. 6, 2019, vol. 7, pp. 127639-127651.
Giuliano R., et al., "Machine Learning Techniques for Non-Terrestrial Networks", MDPI, Electronics, Jan. 28, 2023, vol. 12, No. 652, 24 Pages.
Hamdy M.N., "Beamformers Explained," Commscope, https://www.commscope.com/globalassets/digizuite/542044-beamformer-explained-wp-114491-en.pdf, Jul. 2020, 28 pages.
Zacks D., et al., "Intelligent Network Probe Adjustment Based on Leosat Conditions", Technical Disclosure Commons, Aug. 2023, 9 Pages.

* cited by examiner

SYSTEM-LEVEL CONTROL PLANE PROTOCOL STACK (TRANSPARENT SATELLITE/DRONE)

200

1100

1200

MANAGING TERRESTRIAL AND NON-TERRESTRIAL NETWORKS

TECHNICAL FIELD

The present disclosure relates to network equipment and services.

BACKGROUND

Networking architectures have grown increasingly complex in communication environments. In particular, mobile communication networks have grown substantially as end users become increasingly connected to mobile network environments. As the number of mobile users increases, efficient management of communication resources and of mobile users becomes more critical.

DESCRIPTION OF EXAMPLE EMBODIMENTS

Overview

Figure 1:
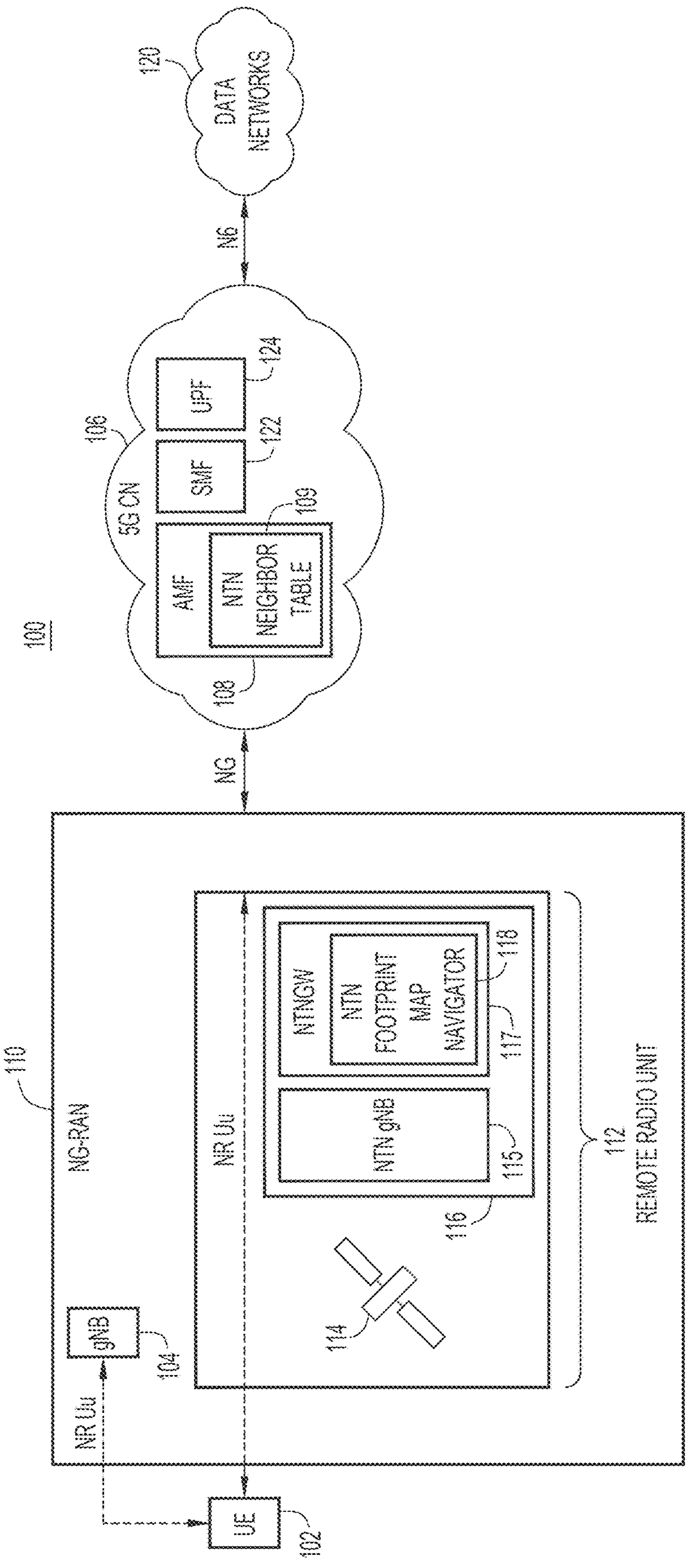
FIG. 1 is a block diagram of a system in which techniques that enable real-time adjustments in network coverage using a non-terrestrial network neighbor table may be implemented, according to an example embodiment.

The Third ($3^{rd}$) Generation Partnership Project (3GPP) has been working on integrating non-terrestrial networks (NTNs) into the Fifth Generation (5G) cellular communication ecosystem. The standardization of the non-terrestrial network is set to begin from Release 18, making it a primary focus in 5G-Advanced, which is the next evolutionary step in 5G technology. Due to the challenging geographical terrains in some areas, network operators often struggle to provide comprehensive network coverage across the country. NTN, however, can aid operators in reducing these network coverage gaps.

Generally, satellites may offer broader coverage to user devices due to their distance from the earth. Satellites may use multiple beams to cover predetermined areas. Currently, there is no established coordination between 5G terrestrial networks and non-terrestrial networks to determine which areas need satellite coverage. Terrestrial network coverage conditions tend to fluctuate, and so it may not be practical to manually adjust the satellite coverage location every time there is a need to cover an additional area or shift the current coverage area. Given that satellites are in constant motion, there may be instances in which satellite coverage is unavailable. However, the beamforming feature in 5G Radio may be used to dynamically alter the coverage area. Controlling the gNB beamforming feature based on satellite availability could be advantageous.

Embodiments described herein provide for coordinating the satellite coverage area with the help of the access and mobility management function (AMF) in the 5G core. Simultaneously, embodiments described herein provide for orchestrating coverage of radio base stations based on the availability of satellite coverage. In particular, embodiments described herein provide for a comprehensive list of neighboring nodes that includes both terrestrial and non-terrestrial networks to be maintained in the AMF along with the respective location information (e.g., GPS coordinates) of the terrestrial and non-terrestrial networks. If a terrestrial or non-terrestrial network is unavailable (e.g., due to congestions, service disruption, loss of connection, or some other issue), the AMF may locate a neighboring network and some or all traffic may be offloaded or diverted to the neighboring network. Integrating terrestrial and non-terrestrial networks within the 5G architecture enhances connectivity and traffic management.

In some embodiments, the GPS coordinates of the terrestrial and non-terrestrial gNBs and/or the list of neighboring nodes may be provided to a RAN Coverage Map Footprint Coordinator (RCMFC). The RCMFC may maintain an up-to-date coverage map that encompasses both terrestrial and non-terrestrial networks. Using the GPS coordinates obtained from the AMF, the RCMFC may assist in charting navigation routes for drones and may map out courses to intended destinations that fall within the coverage zones of the networks, taking into account both altitude and geographic coordinates.

EXAMPLE EMBODIMENTS

Reference is now made to FIG. 1. FIG. 1 is a diagram illustrating an environment 100 in which embodiments may be implemented. Environment 100 may include user equipment (UE) 102, next generation (NG) radio access network (RAN) 110, 5G core network (CN) 106, and data network 120.

In various embodiments, UE 102 may be associated with any electronic device, machine, robot, etc. wishing to initiate a flow in systems discussed herein. The terms ‘device’, ‘electronic device’, ‘UE’, ‘automation device’, ‘computing device’, ‘machine’, ‘robot’, and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within environment 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein and more than one UE 102 may be referred to herein as UEs 102. UE 102 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate over-the-air interfaces with any combination of RANs (e.g., NG-RAN 110).

UE 102 may access data network 120 using a terrestrial network (e.g., using gNB 104) or a non-terrestrial network (NTN) (e.g., using remote radio unit 112). An NTN refers to a network or segment of networks that use radio frequency resources onboard a satellite or an unmanned aircraft system (UAS) platform, such as a drone.

NG-RAN 110 includes a remote radio unit 112 and a terrestrial gNB 104. As illustrated in FIG. 1, when accessing data network 120 using a terrestrial network, UE 102 may connect to and communicate with gNB 104 using an NR-Uu (New Radio-Uu) interface. When accessing data network 120 using an NTN, UE 102 may connect to and communicate with remote radio unit 112 using an NR-Uu interface.

Remote radio unit 112 includes a satellite (or drone) 114, an NTN gNB 115, and an NTN gateway (NTNGW) 117. As used herein, a satellite refers to a space-borne vehicle placed into Low Earth Orbit (LEO), Medium Earth Orbit (MEO), or Geostationary Earth Orbit (GEO). Satellite 114 may generate beams using an antenna to provide coverage to an area based on the direction and focusing of the beams. Satellite 114 may be preprogrammed to focus the beams to provide coverage to a certain area. According to embodiments described herein, the satellite may move or adjust the beams to provide coverage to a different or larger/smaller area. Satellite 114 may adjust the beams based on an instruction from NTNGW 117.

In general, satellite 114 may implement either a transparent or regenerative payload. Embodiments described herein concentrate on employing the transparent model for non-terrestrial networks and FIG. 1 illustrates a transparent satellite-based NG-RAN architecture. The satellite 114 may generate beams over a given service area bounded by its field of view. UE 102 may be served by satellite 114 within the targeted service area.

In general, the NTNGW 117 may connect an NTN to a public data network (e.g., 5G CN 106). According to embodiments herein, the NTN gNB 115 and the NTNGW 117 share a location, referred to herein as NTN gNB+NTNGW 116. As illustrated in FIG. 1, according to embodiments described herein, an NTN Footprint Map Navigator 118 may be integrated with the NTNGW 117. The NTN Footprint Map Navigator 118 may be capable of interpreting location information, such as GPS coordinates, enabling the NTNGW 117 to guide satellites or drones to adjust their coverage beams according to the GPS positions. For example, the NTN Footprint Map Navigator 118 may decode and understand GPS coordinates and help adjust the beams of satellite 114 to provide coverage to the area indicated by the GPS coordinates.

As illustrated in FIG. 1, satellite 114 repeats an NR-Uu radio interface from a feeder link (between NTNGW 117 and the satellite 114) to a service link (between the satellite 114 and the UE 102) and vice versa. The NTNGW 117 supports the necessary functions to forward the signal for the NR-Uu interface.

While several gNBs may access a single satellite payload, the description herein has been simplified to a single gNB 104 accessing the satellite payload for simplicity and without loss of generality. As used herein, gNB 104 may refer to a single gNB or multiple gNBs. In addition, the term gNBs 104 may refer to multiple gNBs. Similarly, NTN gNB 115 may refer to a single NTN gNB 115 or multiple NTN gNBs and the term NTN gNBs 115 may be used to refer to multiple NTN gNBs.

When using a terrestrial network, UE 102 may access data network 120 using gNB 104. gNB 104 may facilitate access with access data network 120 via 5G CN 106. gNB 104 interfaces with 5G CN 106 via an NG interface and 5G CN 106 interfaces with data network 120 via an N6 interface. 5G CN 106 may include, among other functions, an access and mobility management function (AMF) 108, a session management function (SMF) 122, and a user plane function (UPF) 124. Typically, an AMF, such as AMF 108, provides access authentication services, authorization services, and mobility management control functions. SMF 122 may be responsible for session management with individual functions being supported on a per session basis for 5G sessions. UPF 124 may support features and capabilities to facilitate user plane operations, such as packet routing and forwarding, interconnection to a data network, policy enforcement, and data buffering for 5G network connectivity.

According to embodiments described herein, gNBs 104 (i.e., terrestrial gNBs) and NTN gNBs 115 may transmit their GPS coordinates to AMF 108 and AMF 108 may store the GPS coordinates for gNBs 104 and NTN gNBs 115. The frequency at which these coordinates are reported to the AMF 108 may be controlled by AMF 108. In some embodiments, the coordinates may be reported to the AMF 108 on a periodic basis.

Each gNB 104 may be aware of its active neighboring nodes—both terrestrial and non-terrestrial. Each gNB 104 may acquire this information, for example, through an Automatic Neighbor Relations (ANR) function. In one embodiment, UEs 102 may identify the Public Land Mobile Networks (PLMNs) of neighboring nodes and transmit the neighbor information to gNBs 104. Based on the PLMN identifiers, gNBs 104 may determine whether each neighbor node is a terrestrial neighbor node or a non-terrestrial neighbor node. The gNBs 104 may produce NTN neighbor reports based on the identified NTN neighbors and transmit the NTN neighbor reports to AMF 108. In one embodiment, NTN gNBs 115 may additionally obtain information associated with neighboring nodes and transmit the information to AMF 108.

AMF 108 may obtain NTN neighbor reports from all gNBs 104 or from a specified group of gNBs 104. In some embodiments, AMF 108 may additionally obtain NTN neighbor reports from NTN gNBs 115. In one embodiment, the NTN neighbor reports may be obtained through a Next Generation Application Protocol (NGAP) message titled "NTN Neighbor Report Command." AMF 108 may be programmed to determine how frequently the NTN neighbor reports are collected from the gNBs 104 and/or NTN gNBs 115.

The NTN neighbor list for a gNB 104 may include details such as the NTN gNB identifier (ID) for the neighboring NTN gNB 115 and a Tracking Area Identity (TAI) for the tracking area associated with the neighboring NTN gNB 115. Using the received information, the AMF 108 may compile and store NTN Neighbor Table 109. In some embodiments, the AMF 108 may compile an NTN Neighbor Table 109 for each TAI. For example, for each TAI, the NTN Neighbor Table 109 may store identifiers for one or more gNBs 104 associated with the TAI and an indication of NTN nodes that neighbor the TAI. In some embodiments, the AMF 108 may additionally compile an NTN Neighbor Table 109 for NTN gNBs 115 and/or an NTN Neighbor Table 109 for gNBs 104 and NTN gNBs 115.

As described in further detail below, the NTN Neighbor Table 109 may be used to adjust network coverage, particularly during terrestrial congestion or satellite outages. For example, during terrestrial congestion or satellite outages, AMF 108 may consult the NTN Neighbor Table 109 to identify neighbors of terrestrial gNBs 104 or NTN gNBs 115 so that traffic may be offloaded to neighbors or so that neighbors may broaden their coverage to provide service to additional traffic. In other embodiments, as described below with respect to FIG. 9, a RAN Coverage Map Footprint Coordinator (RCMFC) may gather the positional GPS data of the gNBs 104 and the NTN gNBs 115 from AMF 108 through the Network Exposure Function (NEF) and the positional data may be used to chart navigation routes for drones.

While 5G standards and devices (e.g., 5G CN 106) have been described herein, embodiments may be implemented in other (e.g., future) standards for wireless networking technology. For example, Sixth Generation (6G) or different standards for wireless technology may be implemented with the embodiments described herein.

Figure 2:
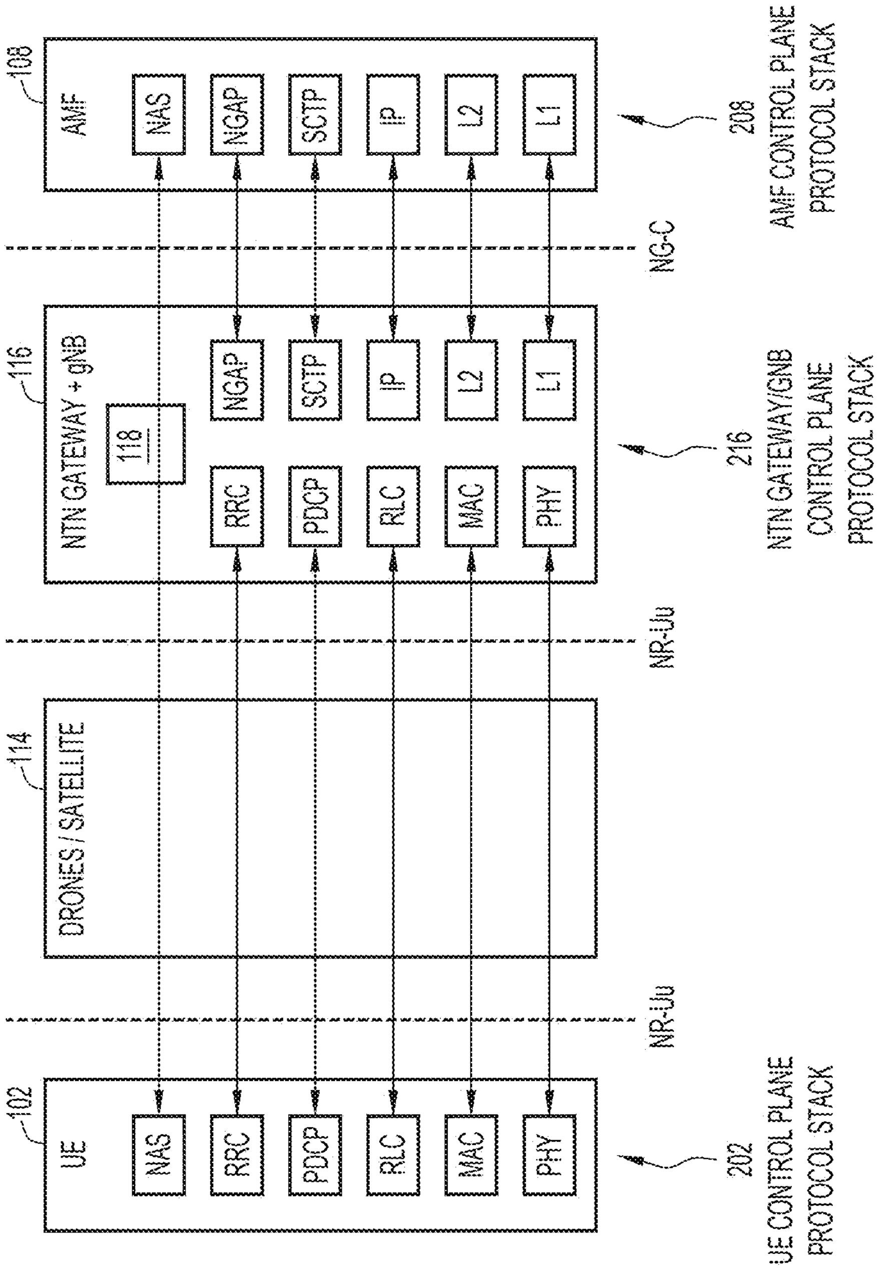
FIG. 2 illustrates a system-level control plane protocol stack for a transparent satellite or drone, according to an example embodiment.

Reference is now made to FIG. 2. FIG. 2 illustrates a system-level control plane protocol stack 200 for a transparent satellite or drone. The system-level control plane protocol stack 200 includes a UE Control Plane Protocol Stack 202 for UE 102, an NTN Gateway/gNB Control Plane Protocol Stack 216 for NTN Gateway+gNB 116, and an AMF Control Plane Protocol Stack 208 for AMF 108.

The UE Control Plane Protocol Stack 202 includes the physical layer (PHY), the Medium Access Control (MAC), Radio Link Control (RLC), and Packet Data Convergence Control (PDCP) layer, and the Radio Resource Control (RRC) and Non-Access Stratum (NAS) layer. The NAS signaling from the UE 102 is transported toward the 5G core and AMF 108 and vice versa.

The NTN Gateway/gNB Control Plane Protocol Stack 216 includes PHY, MAC, RLC, PDCP, and RRC levels for communicating with UE 102. The NTN Gateway/gNB Control Plane Protocol Stack 216 includes Layer 1 (L1), Layer 2 (LP), Internet Protocol (IP), stream control transport protocol (SCTP), and Next Generation Application Layer (NGAP) levels for communicating with AMF 108 and the core network. AMF Control Plane Protocol Stack 208 includes L1, L2, IP, SCTP, and NGAP levels for communicating with NTN Gateway+gNB 116. As indicated above, the NAS signaling from AMF 108 is transported toward the UE 102.

According to embodiments described herein, NTN Gateway/gNB Control Plane Protocol Stack 216 additionally includes NTN Footprint Map Navigator 118. NTN Footprint Map Navigator 118 may decode GPS coordinates received from AMF 108 to direct satellites 114 to adjust beams to alter coverage areas associated with NTNs.

Figure 3:
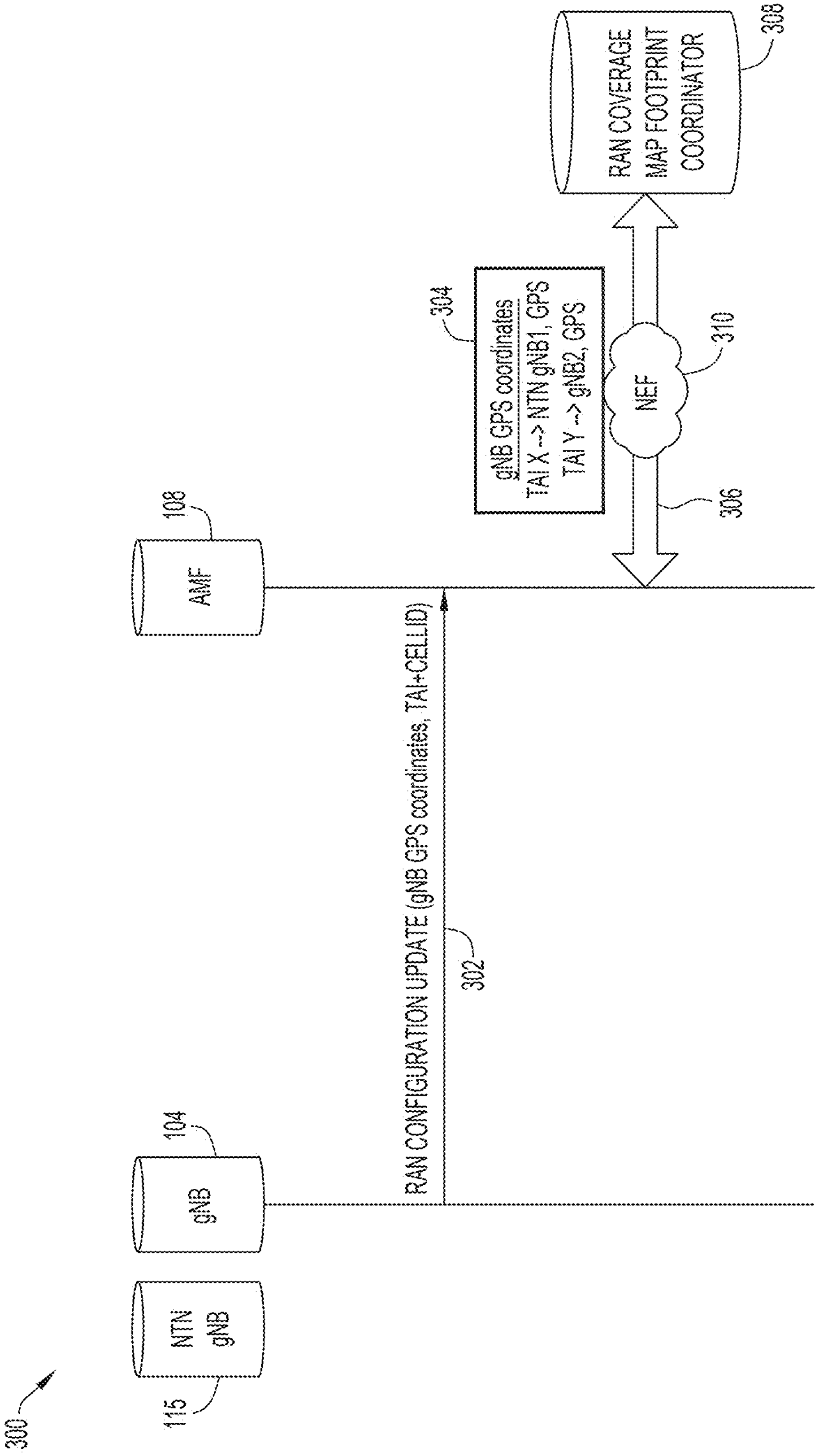
FIG. 3 is a message sequence diagram illustrating a method of obtaining Global Positioning System (GPS) coordinates from terrestrial gNodeBs (gNBs) and non-terrestrial network gNBs, according to an example embodiment.

Reference is now made to FIG. 3. FIG. 3 is a message sequence diagram illustrating a method 300 of obtaining GPS coordinates from gNBs 104 and NTN gNBs 115. The method 300 may be performed, for example, by gNB 104, NTN gNB 115, AMF 108, and RAN Coverage Map Footprint Coordinator (RCMFC) 308.

At 302, NTN gNBs 115 and gNBs 104 transmit a RAN configuration update to AMF 108 with their location data. The location data may include the GPS coordinates of the gNBs 104 or NTN gNBs 115 and the TAI+CELLID (i.e., the TAI and cell identifier) corresponding to the gNBs 104 or NTN gNBs 115. gNB GPS coordinates store 304 shows an example list of the location data received from gNBs 104 and NTN gNBs 115. As shown in FIG. 3, gNB GPS coordinates store 304 stores the coordinates based on the TAI corresponding to the gNBs 104 or NTN gNBs 115. For example, for TAI X, gNB GPS coordinates store 304 stores a corresponding identifier NTN gNB1 and the corresponding GPS coordinates for NTN gNB1. The entry for TAI Y stores the identifier for the corresponding gNB gNB2 and the GPS coordinates for gNB2.

At 306, AMF 108 may transmit the positional data for the gNBs 104 and NTN gNBs 115 to the RCMFC 308 through the NEF 310. As discussed below with regard to FIG. 9, RCMFC 308 may use the positional data to, for example, chart navigation routes for drones.

Figure 4:
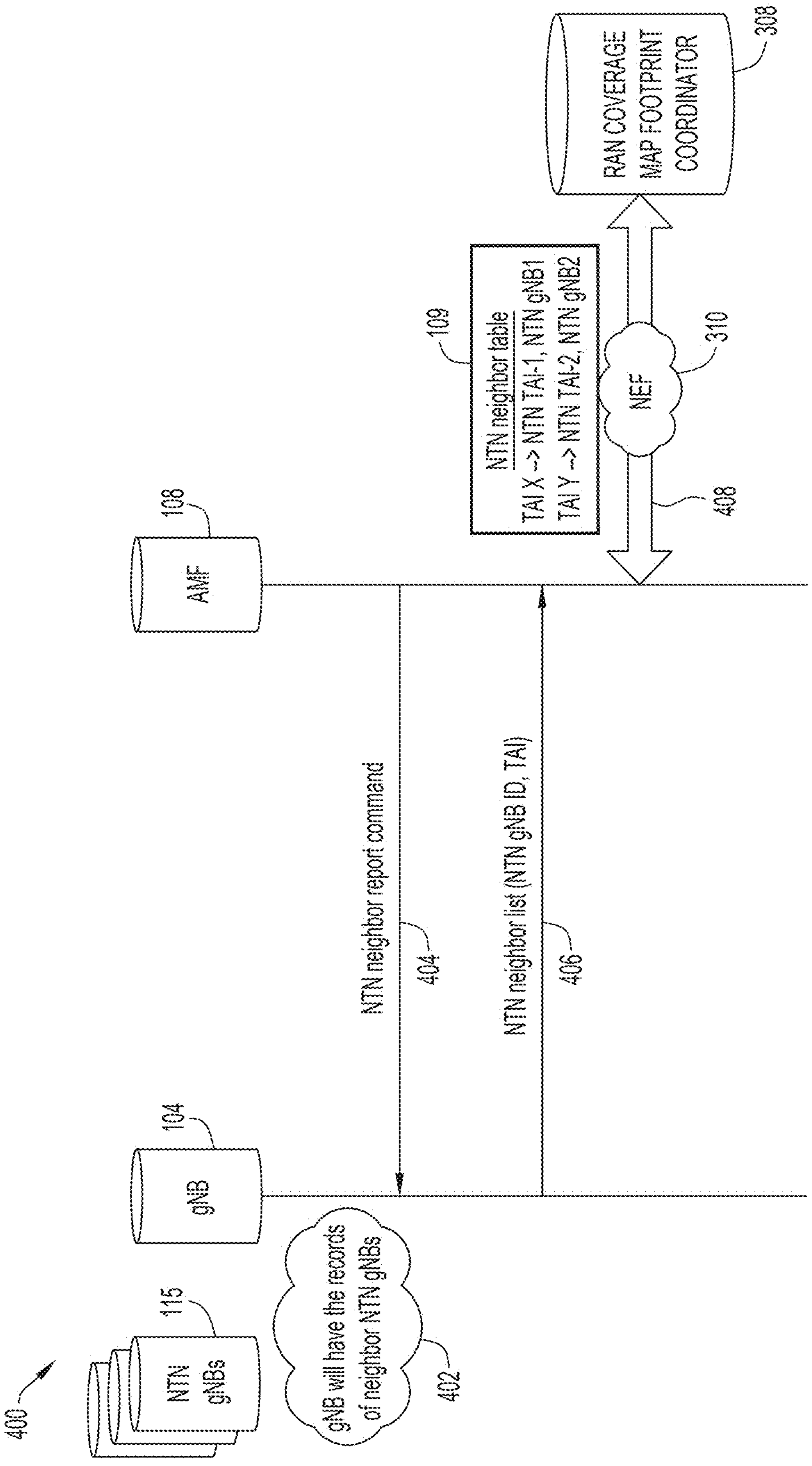
FIG. 4 is a message sequence diagram illustrating a method of creating and storing a non-terrestrial network neighbor table, according to an example embodiment.

Reference is now made to FIG. 4. FIG. 4 is a message sequence diagram illustrating a method 400 of creating and storing NTN Neighbor Table 109. Method 400 may be performed, for example, by NTN gNB 115, gNB 104, and AMF 108.

As illustrated in FIG. 4, at 402, gNBs 104 have obtained the records of neighboring NTN gNBs 115. As discussed above, in some embodiments, gNBs 104 may have obtained the PLMN identifiers of neighboring nodes from UEs 102 and identified which of the neighboring nodes are NTN nodes based on the PLMN identifiers. In some embodiments, the information associated with the neighboring NTN gNBs 115 may be obtained through an Automatic Neighbor Relations (ANR) function. The ANR function relies on cells broadcasting their identities at a global level.

At 404, AMF 108 transmits an NGAP message called "NTN Neighbor Report Command" to the gNBs 104 (or a specified group of gNBs 104) requesting the NTN neighbor reports from the gNBs 104. The AMF 108 may be programmed to determine how frequently the neighbor reports should be collected. For example, the AMF 108 may transmit the "NTN Neighbor Report Command" to the gNBs 104 periodically based on the determination of how frequently the neighbor reports should be collected. At 406, AMF 108 obtains the NTN neighbor lists from the gNBs 104. The NTN neighbor list may include, for example, an indication of one or more neighboring nodes for each TAI. For each neighboring node, NTN neighbor list may store an identifier of the NTN gNB 115 (e.g., NTN gNB ID) associated with the neighboring node and the TAI associated with the neighboring NTN gNB 115.

Using the information received from the gNBs 104, AMF 108 compiles NTN Neighbor Table 109. The NTN Neighbor Table 109 may be compiled for each TAI. As illustrated in the example NTN Neighbor Table 109 of FIG. 4, terrestrial TAI X may have a neighbor NTN gNB 115 with the identifier NTN gNB1 that is associated with the TAI "NTN TAI-1" and terrestrial TAI Y may have a neighbor NTN gNB 115 with the identifier NTN gNB2 that is associated with the TAI "NTN TAI-2." Although the example NTN Neighbor Table 109 illustrated in FIG. 4 shows two TAIs, additional TAIs with corresponding neighbor NTN gNB information may be stored in NTN Neighbor Table 109.

At 408, AMF 108 may transmit the NTN Neighbor Table 109 to the RAN Coverage Map Footprint Coordinator (RCMFC) 308 through the NEF 310. As discussed below with regard to FIG. 9, RCMFC 308 may use the positional data to, for example, chart navigation routes for drones.

Figure 5:
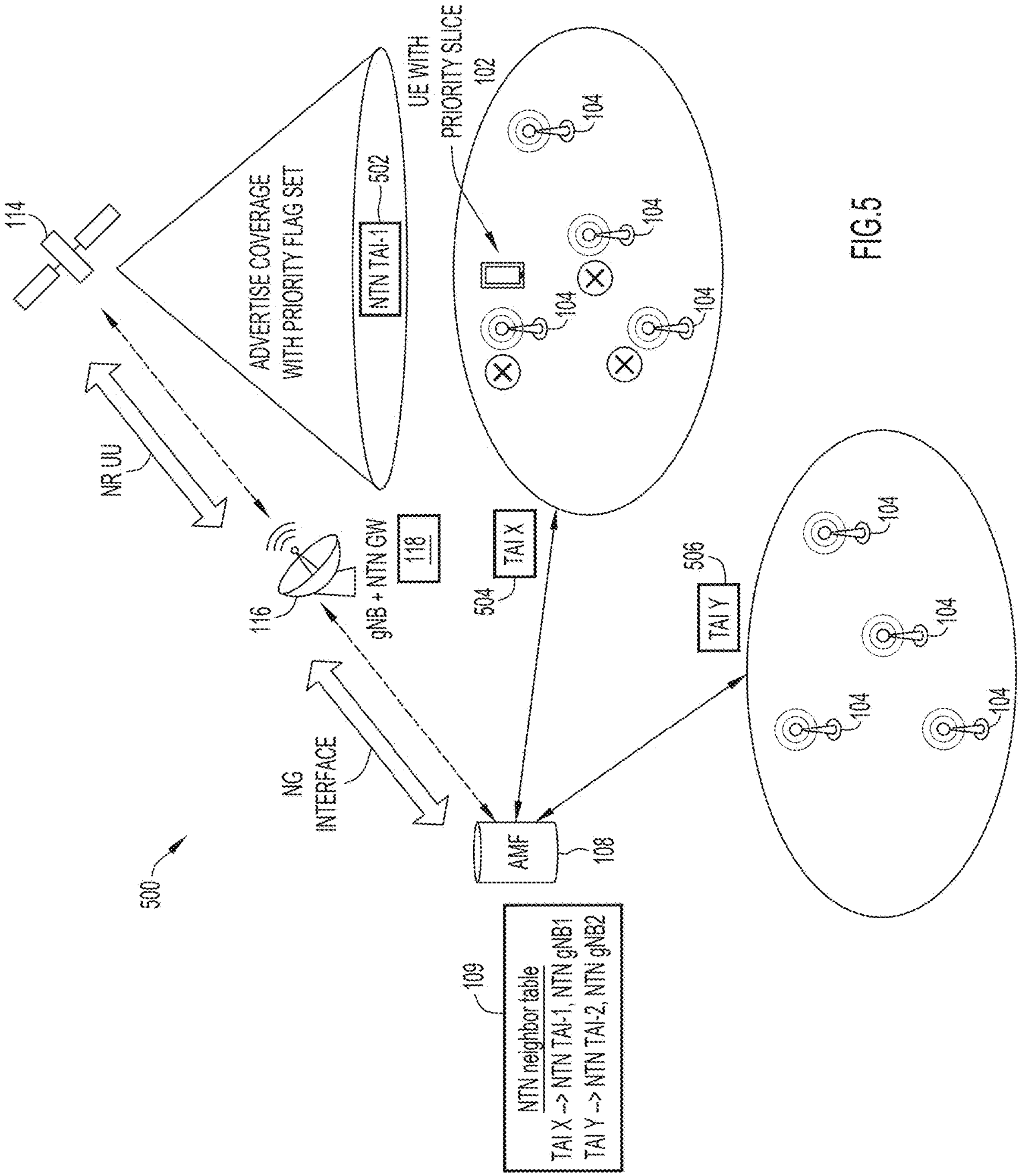
FIG. 5 is a diagram illustrating an environment in which high-priority traffic is redirected to non-terrestrial networks during a terrestrial network overload, according to an example embodiment.

Reference is now made to FIG. 5. FIG. 5 is a diagram illustrating an environment 500 in which high-priority terrestrial network traffic is redirected to NTNs during a terrestrial network overload.

In instances of terrestrial network congestion, which may occur during large-scale events such as festivals, carnivals, concerts, etc. where crowds converge in a specific location, gNBs 104 may detect and report the congestions. In the example illustrated in FIG. 5, the gNBs 104 in TAI X 504 504 that are marked with an "X" are experiencing congestion. The gNBs 104 in neighboring TAI Y 506 are not experiencing congestion. The gNBs 104 in TAI X 504 that are experiencing congestion may report the congestion to AMF 108.

After obtaining the indication of the network congestion from the gNBs 104, the AMF 108 may consult the current NTN Neighbor Table 109 to identify any nearby non-terrestrial networks. As illustrated in FIG. 5, NTN gNB1 in NTN TAI-1 is a neighboring non-terrestrial network of TAI X 504. AMF 108 may transmit information associated with the congested gNBs 104 and/or the TAI associated with the congested gNBs 104 to the NTN gNB+NTNGW 116 associated with the adjacent NTN TAI. In this example, AMF 108 may transmit the identifier and GPS coordinates of the congested gNBs 104 and the identifier of TAI X 504 to gNB+NTNGW 116 associated with NTN TAI-1 502.

Equipped with the GPS coordinates associated with the congested gNBs 104, NTN gNB+NTNGW 116 associated with neighboring NTN TAI-1 502 may adjust coverage to give priority service to some UEs 102 being served by congested gNBs 104. For example, priority service may be given to UEs 102 that are high priority or are associated with a high Quality of Service (QoS) guarantee. In other examples, other UEs 102 may be given priority service based on different factors. In particular, NTN Footprint Map Navigator 118 may interpret the GPS coordinates associated with the congested gNBs 104 to enable the NTNGW 117 to guide satellites or drones to adjust their coverage beams according to the received GPS coordinates to provide coverage to the area associated with the congested gNBs 104.

In one embodiment, gNB+NTNGW 116 may activate a priority flag to facilitate high QoS slices for users through the NTN connection. In this way, high priority traffic may be offloaded to the neighboring NTN, thereby sustaining service quality in spite of the significant terrestrial network load. By offloading the high priority traffic, the high priority UEs may experience faster service and a higher QoS using the NTN. In addition, the congestion on the gNBs 104 may be eased because some of the traffic is being routed to the NTN and less traffic is attempting to connect to the congested gNBs 104.

Figure 6:
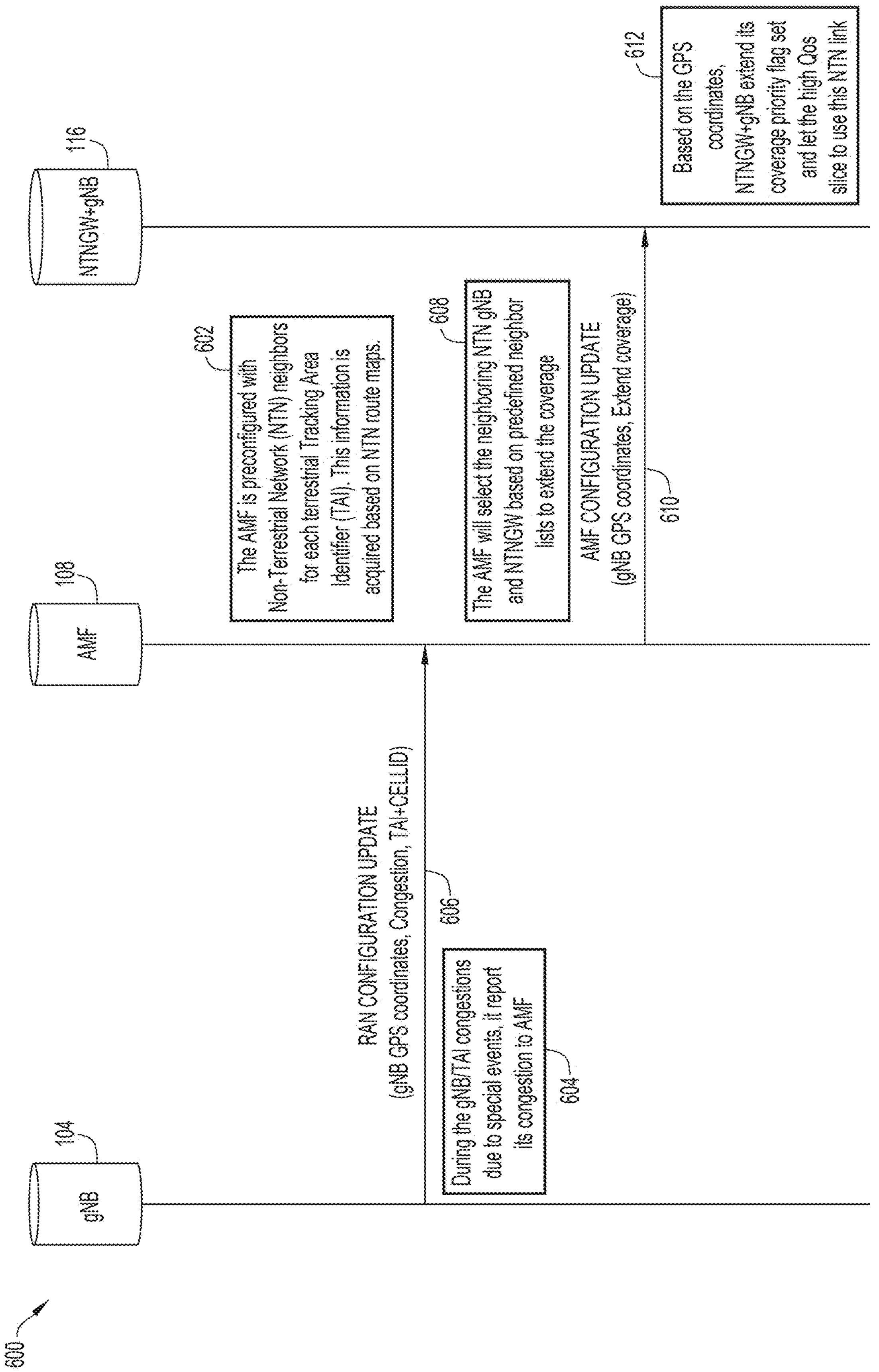
FIG. 6 is a message sequence diagram illustrating a method of redirecting high-priority traffic to non-terrestrial networks during terrestrial network overload, according to an example embodiment.

Reference is now made to FIG. 6. FIG. 6 is a message sequence diagram illustrating a method 600 of redirecting high-priority traffic to NTNs during terrestrial network overload. The method 600 may be performed, for example, by gNB 104, AMF 108, and NTNGW+gNB 116.

At 602, the AMF 108 is preconfigured with NTN neighbors for each terrestrial TAI, as described above with respect to FIG. 4. This information may be acquired based on NTN route maps. At 604, gNB 104 determines that it is experiencing congestion (e.g., due to a special event in which many UEs are in the same area) and reports its congestion to AMF 108. Specifically, at 606, gNB 104 transmits a RAN configuration update to AMF 108 indicating that gNB 104 is congested. The RAN configuration update includes the GPS coordinates of gNB 104, an indication that gNB 104 is experiencing congestion, and the TAI+CELLID associated with gNB 104.

At 608, the AMF 108 identifies an NTN that neighbors gNB 104 using NTN Neighbor Table 109. The AMF 108 identifies the neighboring NTN gNB+NTNGW 116 using the predefined neighbor lists. At 610, AMF 108 transmits an AMF configuration update to the identified neighboring NTN gNB+NTNGW 116. The AMF configuration update includes the GPS coordinates of congested gNB 104 and an instruction to extend coverage. In some embodiments, the instructions indicate to allow the high QoS slice use the NTN link. At 612, based on the received GPS coordinates, NTNGW+gNB 116 extends its coverage to cover the area indicated by the GPS coordinates, sets a priority flag, and allows some traffic (e.g., the high QoS slice) to use the NTN link. In this way, the high priority traffic is able to use the NTN link to maintain a high QoS and the congestion on gNB 104 is cased.

Figure 7:
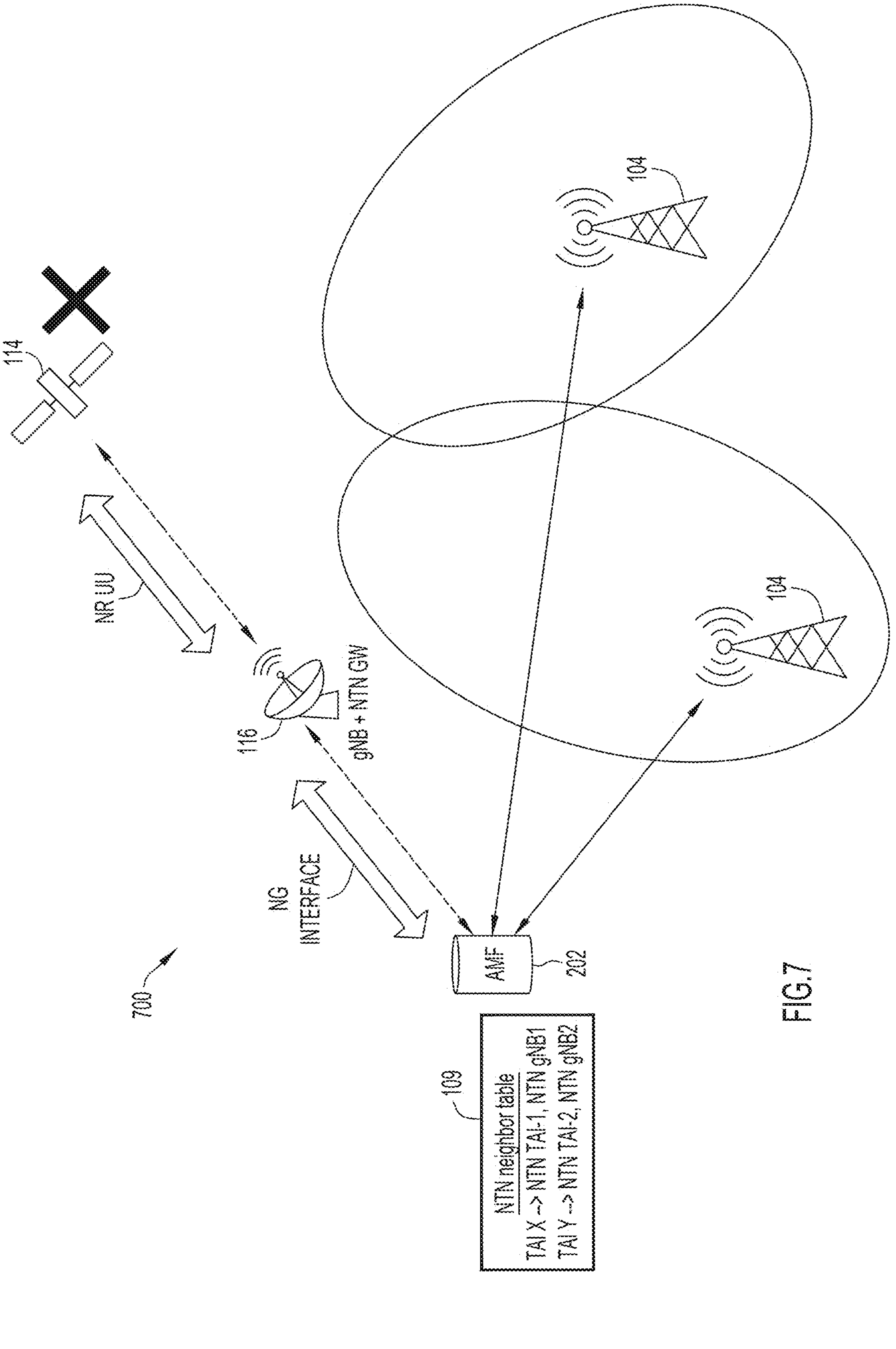
FIG. 7 illustrates an environment in which coverage is provided in non-terrestrial network tracking areas during satellite/drone outages, according to an example embodiment.

Reference is now made to FIG. 7. FIG. 7 illustrates an environment 700 in which coverage is provided in NTN TAI areas during satellite/drone outages.

In the example illustrated in FIG. 7, gNB+NTNGW 116 has lost connectivity with a satellite (or drone) 114, which has caused a service disruption. In particular, NTNGW 117 may lose connectivity with satellite 114 and NTN gNB 115 may notify AMF 108 of the loss of connectivity. For example, NTN gNB 115 may report "no NTN gNB coverage" to AMF 108 along with the relevant TAI and GPS coordinates associated with the satellite 114.

AMF 108 may perform a lookup in NTN Neighbor Table 109 to identify adjacent or neighboring terrestrial gNBs 104. AMF 108 may instruct the neighboring terrestrial gNBs 104 to broaden their coverage area. AMF 108 may additionally provide the GPS coordinates of the area previously served by the satellite 114 to neighboring terrestrial gNBs 104. The neighboring gNBs 104 may extend their reach toward the specified GPS coordinates utilizing their beamforming capabilities. In this way, the neighboring gNBs 104 may compensate for the lack of coverage due to the satellite (or drone) 114 disconnection. In other words, the neighboring gNBs 104 may provide service to some of the traffic that lost service due to the outage of the satellite 114.

Figure 8:
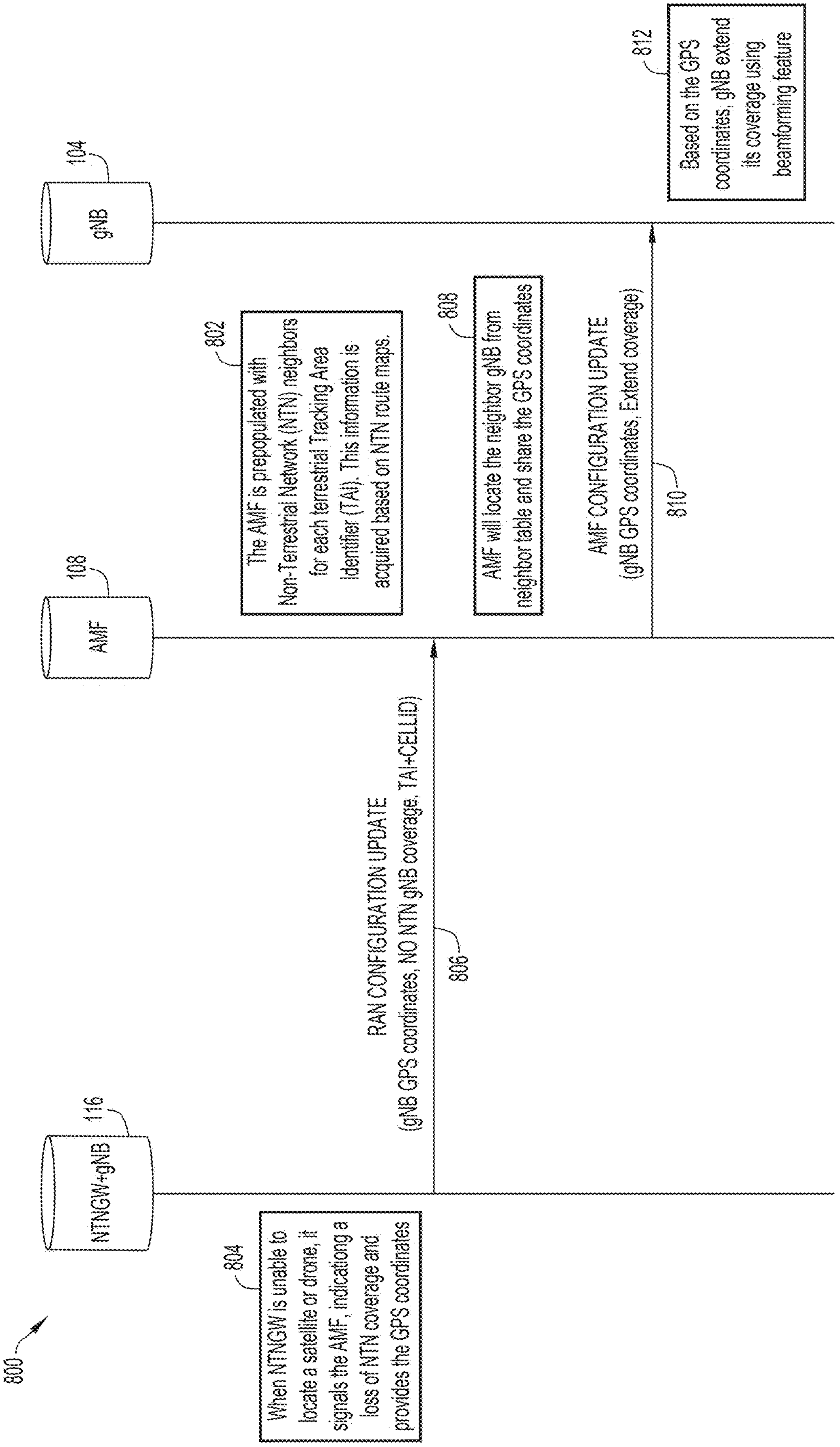
FIG. 8 is a message sequence diagram illustrating a method of providing coverage in non-terrestrial network tracking areas during satellite/drone outages, according to an example embodiment.

Reference is now made to FIG. 8. FIG. 8 is a message sequence diagram illustrating a method 800 of providing coverage in NTN TAI areas during satellite/drone outages. Method 800 may be performed, for example, by NTGW+gNB 116, AMF 108, and gNB 104.

At 802, AMF 108 is prepopulated with NTN neighbors for each terrestrial TAI, as described above with respect to FIG.

4. This information may be acquired based on NTN route maps. At 804, when the NTNGW 117 is unable to locate a satellite (or drone) 114, NTN gNB 115 signals the AMF 108 that a loss of NTN coverage has occurred and provides the GPS coordinates of the area that has lost coverage. In particular, at 806, NTNGW+gNB 116 transmits a RAN configuration update to AMF 108. The RAN configuration update includes the gNB GPS coordinates of the area that has lost coverage, an indication that there is no NTN gNB coverage, and the TAI+CELLID of the area previously served by the satellite 114.

At 808, the AMF 108 locates the neighbor gNBs 104 from the NTN Neighbor Table 109 and shares the GPS coordinates of the area that lost coverage with the neighbor gNBs 104. In particular, at 810, AMF 108 transmits an AMF configuration update to the neighbor gNBs 104. The AMF configuration update includes the gNB GPS coordinates and an instruction to extend coverage to the area indicated by the GPS coordinates. At 812, based on the GPS coordinates, the gNBs 104 extend their coverage (e.g., using beamforming features) to the area previously served by satellite 114.

Figure 9:
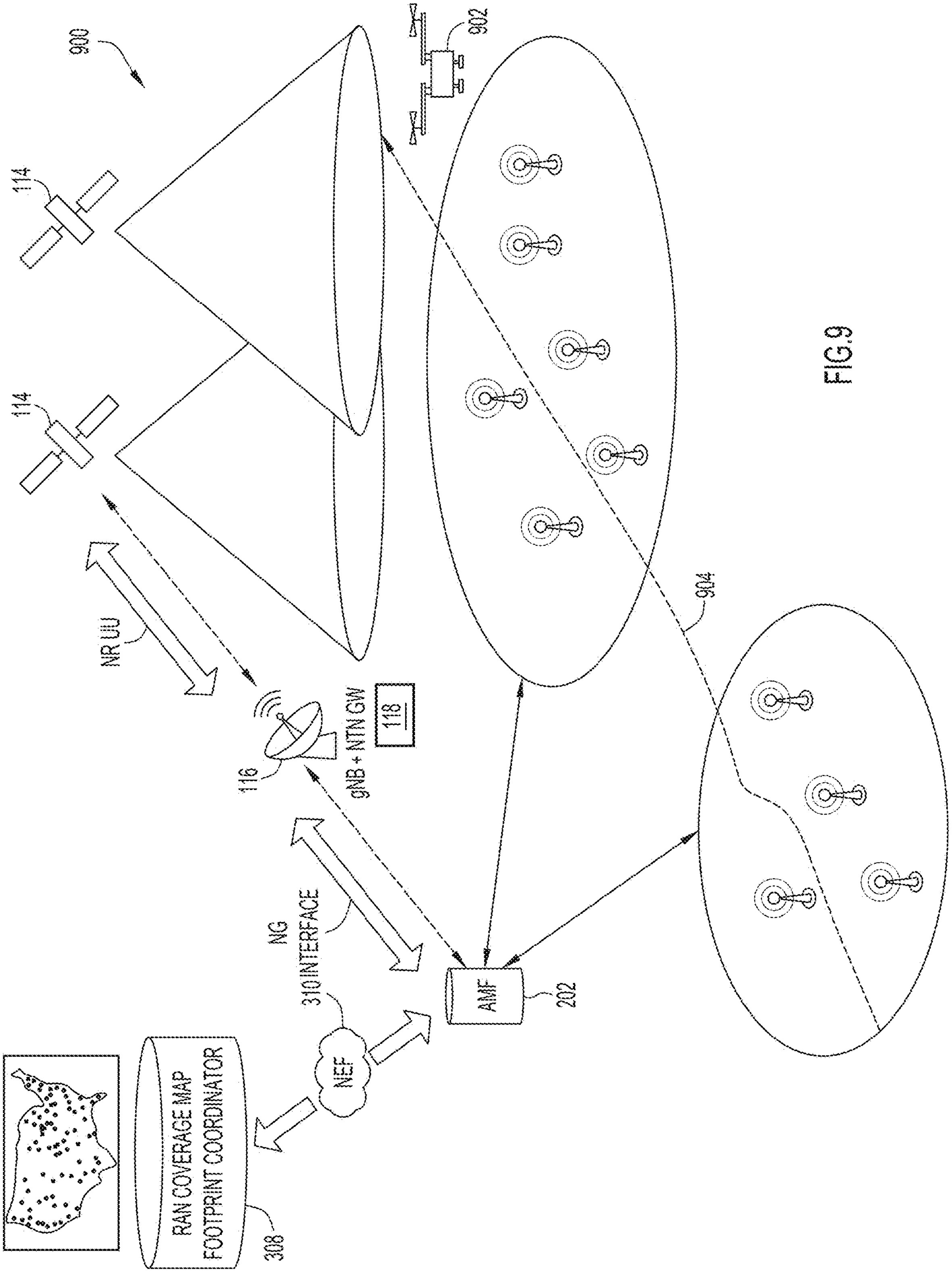
FIG. 9 is a diagram illustrating an environment for providing Fifth Generation (5G) drone navigation management, according to an example embodiment.

Reference is now made to FIG. 9. FIG. 9 is a diagram illustrating an environment 900 for providing 5G drone navigation management.

In the near future, with the anticipated surge in drone usage, the establishment of specific aerial corridors for drones will become essential. These designated pathways will facilitate the orderly management of drone traffic in the airspace while also ensuring persistent network connectivity for the drones. For example, drones may be used by different companies or operators for different reasons, such as for package delivery. Without mapping a navigation route for the different drones, collisions may occur between drones. In addition, it is important to ensure that a drone remains within a particular coverage area. If a drone travels outside of a known coverage area, security may be compromised. Therefore, it is important to map navigation routes for the drones to ensure the safety and security of the drones, information associated with the drones, and entities in the vicinity of the drones.

As described above, the RCMFC 308 may receive GPS coordinate data and NTN neighbor data from AMF 108 and maintain an up-to-date coverage map that encompasses both terrestrial and non-terrestrial networks. Therefore, the RCMFC 308 is well-positioned to assist in charting the navigation routes 904 for drones, such as drone 902. According to embodiments described herein, using the positional and NTN neighbor information received from AMF 108, the RCMFC 308 may map out a navigation route 904 for drone 902 to an intended destination that falls within the coverage zones of the gNBs 104, taking into account both altitude and geographic coordinates.

This route information may then be relayed to a centralized server. For additional drones 902, additional navigation routes 904 or paths may be planned for the drones 902 in such a way that their navigation routes 904 do not intersect with those that have already been established. Mapping navigation routes 904 for the drones 902 based on the GPS coordinate information and the neighbor node information provides for an efficient, collision-free, and secure navigation system.

In some embodiments, more than one operator may communicate with and gather information from RCMFC 308. For example, multiple operators or companies may reach an agreement to connect to the RCMFC 308 when planning navigation routes for drones. In this way, multiple companies or operators may plan navigation routes to ensure that their drones do not interfere or collide with the drones of other companies or operators and to ensure that the drones do not leave an area of coverage.

Figure 10:
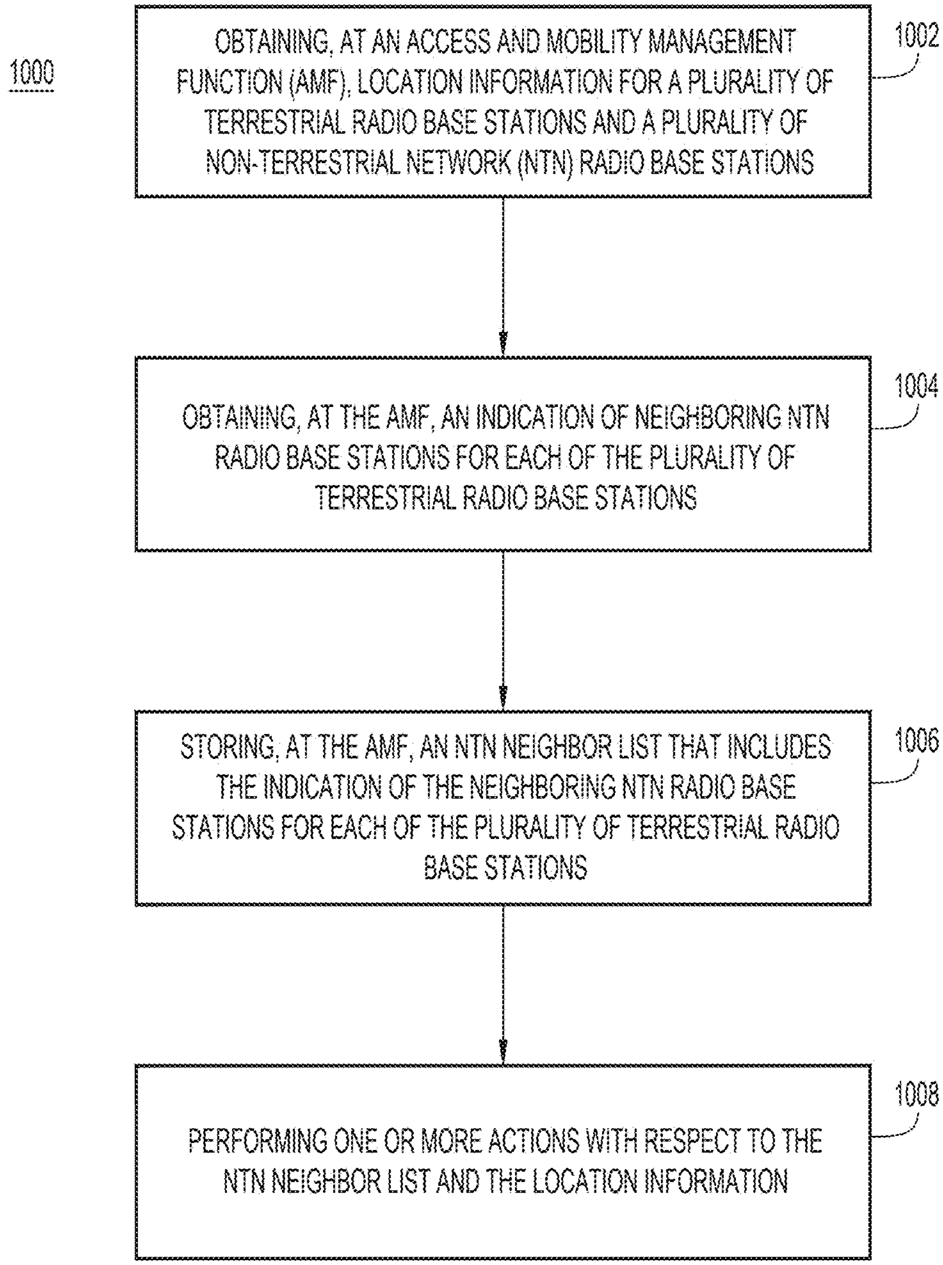
FIG. 10 is a flow chart depicting a method according to an example embodiment.

FIG. 10 is a flow diagram of a method 1000 of performing one or more actions with respect to an NTN neighbor list and GPS coordinates of one or more gNBs or NTN gNBs. Method 1000 may be performed by an AMF, such as AMF 108, in conjunction with one or more gNBs 104 and NTN gNBs 115.

At 1002, method 1000 includes obtaining, at an access and mobility management function (AMF), location information for a plurality of terrestrial radio base stations and a plurality of non-terrestrial network (NTN) radio base stations. For example, AMF 108 may obtain GPS coordinates for gNBs 104 and NTN gNBs 115. At 1004, method 1000 includes obtaining, at the AMF, an indication of neighboring NTN gNBs for each of the plurality of terrestrial gNBs. For example, gNBs 104 may obtain information associated with neighboring nodes and transmit the information to AMF 108.

At 1006, method 1000 includes storing, at the AMF, an NTN neighbor list that includes the indication of the neighboring NTN radio base stations for each of the plurality of terrestrial radio base stations. For example, AMF 108 may create an NTN neighbor list or table that includes information associated with the neighboring NTN nodes, such as the identifier of the neighboring NTN gNB and a tracking area identifier associated with the tracking area covered by the NTN gNB. AMF 108 may compile an NTN neighbor table for each TAI.

At 1008, method 1000 includes performing one or more actions with respect to the NTN neighbor list and the location information. For example, AMF 108 may receive an indication of congestion at a gNB 104 and may identify a neighboring NTN node from the NTN neighbor list or table. AMF 108 may transmit GPS coordinates associated with the congested gNB 104 to the neighboring NTN node with instructions to adjust their coverage to give priority services to traffic associated with the congested gNB 104, such as high QoS traffic associated with the congested gNB 104.

As another example, AMF 108 may receive an indication that a NTNGW has lost connectivity with a satellite or drone and AMF 108 may identify neighboring terrestrial nodes from the NTN neighbor list or table. AMF 108 may instruct the neighboring terrestrial gNBs 104 of the neighboring terrestrial node(s) to broaden their coverage toward GPS coordinates previously served by the satellite/drone to compensate for the lack of coverage due to the satellite or drone disconnection.

In yet another example, AMF 108 may transmit positional data associated with gNBs 104 and NTN gNBs 115 and the NTN neighbor list to the RCMFC 308 (e.g., through NEF 310). RCMFC 308 may use the positional data and NTN neighbor list to plan navigation paths for drones in such a way that their routes do not intersect with paths that have been previously established for other drone.

Integrating terrestrial and non-terrestrial networks within the 5G architecture may enhance connectivity and traffic management. By compiling GPS data and creating a neighbor list that includes non-terrestrial network identifiers, a system is provided that enables real-time adjustments in network coverage, particularly during terrestrial congestion or satellite outages. Additionally, the RAN Coverage Map Footprint Coordinator aids in plotting drone navigation routes, ensuring continuous coverage and efficient traffic flow in the burgeoning drone airspace.

Figure 11:
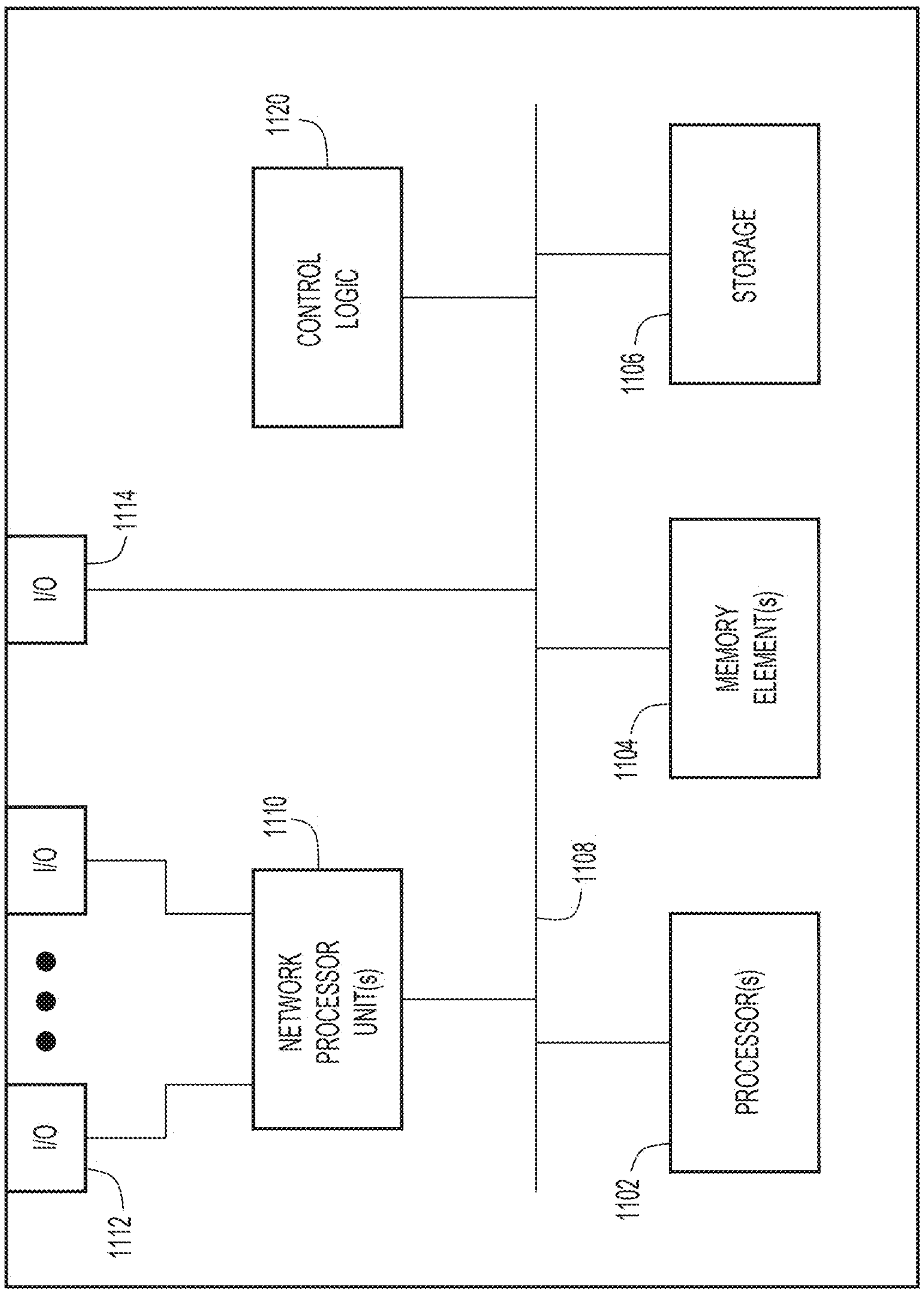
FIG. 11 is a hardware block diagram of a computing device that may perform functions associated with any combination of operations, in connection with the techniques discussed herein.

Referring to FIG. 11, FIG. 11 illustrates a hardware block diagram of a computing device 1100 that may perform functions in connection with the techniques described herein. In various embodiments, a computing device, such as computing device 1100 or any combination of computing devices 1100, may be configured as any of an AMF, an SGW, an SMF, a UPF, a data store, etc. as discussed for the techniques discussed herein.

It should be appreciated that FIG. 11 provides only an illustration of one embodiment and does not imply any limitations with regard to the environments in which different embodiments may be implemented. Many modifications to the depicted environment may be made.

In at least one embodiment, computing device 1100 may be any apparatus that may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device. Processor(s) 1102 (e.g., hardware processor(s)) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory element(s) 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer-readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 12:
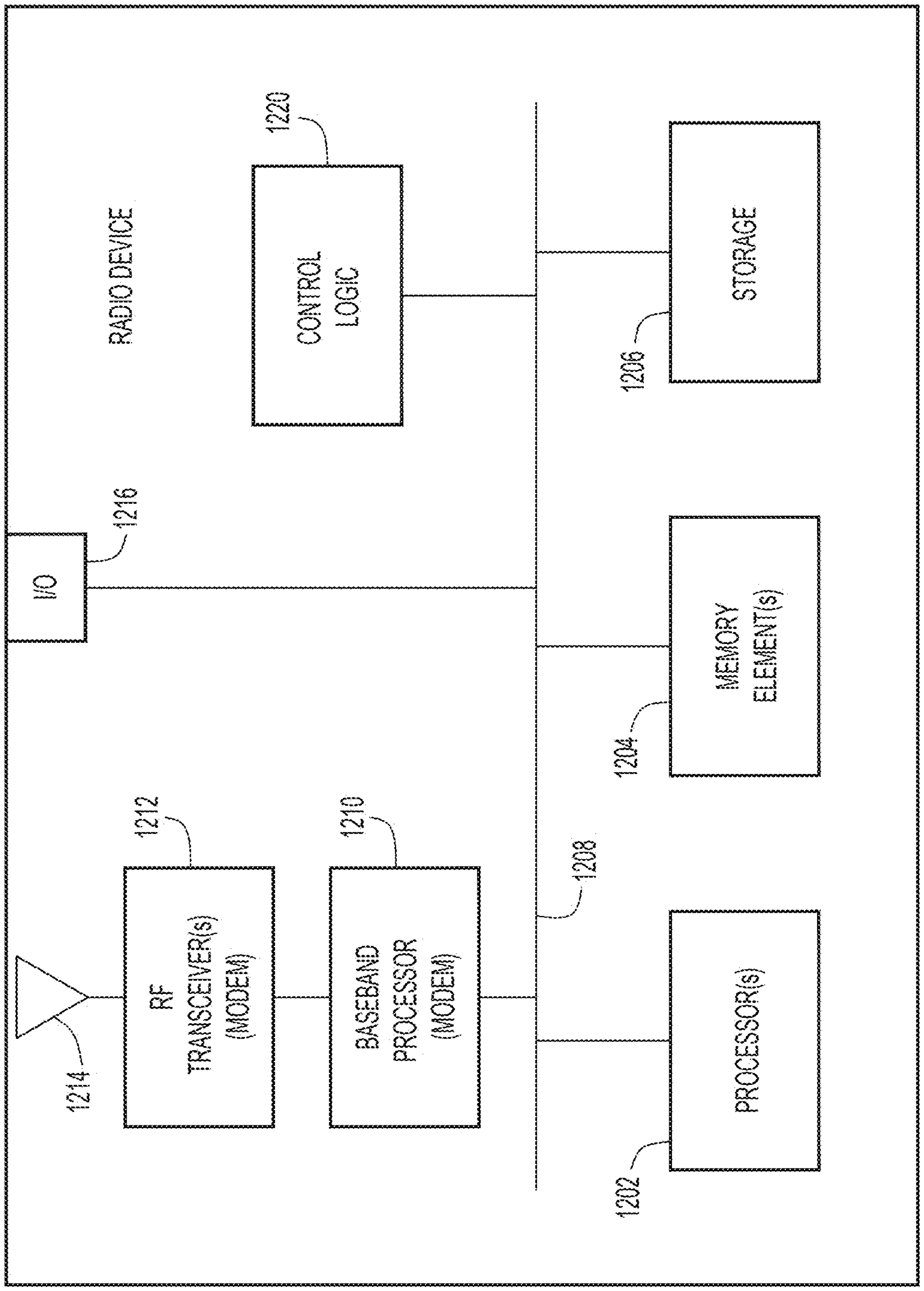
FIG. 12 is a hardware block diagram of a radio device that may perform functions associated with any combination of operations, in connection with the techniques discussed herein.

Referring to FIG. 12, FIG. 12 illustrates a hardware block diagram of a radio device 1200 that may perform functions associated with operations discussed herein. In various embodiments, a user equipment or apparatus, such as radio device 1200 or any combination of radio device 1200, may be configured as any radio node/nodes as depicted herein in order to perform operations of the various techniques discussed herein, such as operations that may be performed by any of a user device, such as UE 102, gNB 104, and NTN gNB 115.

In at least one embodiment, radio device 1200 may be any apparatus that may include one or more processor(s) 1202, one or more memory element(s) 1204, storage 1206, a bus 1208, a baseband processor or modem 1210, one or more radio RF transceiver(s) 1212, one or more antennas or antenna arrays 1214, one or more I/O interface(s) 1216, and control logic 1220.

The one or more processor(s) 1202, one or more memory element(s) 1204, storage 1206, bus 1208, and I/O interface(s) 1216 may be configured/implemented in any manner described herein, such as described herein at least with reference to FIG. 11.

The RF transceiver(s) 1212 may perform RF transmission and RF reception of wireless signals via antenna(s)/antenna array(s) 1214, and the baseband processor (modem) 1210 performs baseband modulation and demodulation, etc. associated with such signals to enable wireless communications for radio device 1200.

In various embodiments, control logic 1220, can include instructions that, when executed, cause processor(s) 1202 to perform operations, which can include, but not be limited to, providing overall control operations of radio device 1200; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120/1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1104/1204 and/or storage 1106/1206 can store data, software, code, instructions (e.g., processor instructions), logic, parameters, combinations thereof, and/or the like used for operations described herein. This includes memory element(s) 1104/1204 and/or storage 1106/1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided comprising: obtaining, at an Access and Mobility Management Function (AMF), location information for a plurality of terrestrial radio base stations and a plurality of non-terrestrial network (NTN) radio base stations; obtaining, at the AMF, an indication of neighboring NTN radio base stations for each of the plurality of terrestrial radio base stations; storing, at the AMF, an NTN neighbor list that includes the indication of the neighboring NTN radio base stations for each of the plurality of terrestrial radio base stations; and performing one or more actions with respect to the NTN neighbor list and the location information.

In one example, storing the NTN neighbor list includes storing a plurality of NTN neighbor lists, each NTN neighbor list being associated with a tracking area identity (TAI) of a tracking area. In another example, performing the one or more actions includes: identifying, from the NTN neighbor list, information associated with a neighboring node of a network node; and transmitting the information associated with the neighboring node to provide adjustments in network coverage.

In another example, identifying the information associated with the neighboring node of the network node includes: obtaining an indication of congestion at one or more terrestrial radio base stations of the plurality of terrestrial radio base stations; and identifying, from the NTN neighbor list, one or more neighboring NTN radio base stations for the one or more terrestrial radio base stations; and wherein transmitting the information associated with the neighboring node includes: transmitting information associated with the one or more terrestrial radio base stations to the one or more neighboring NTN radio base stations.

In another example, identifying the information associated with the neighboring node of the network node includes: obtaining an indication of a service disruption at an NTN radio base station of the plurality of NTN radio base stations; and identifying, from the NTN neighbor list, one or more terrestrial radio base stations, of the plurality of terrestrial radio base stations, that neighbor the NTN radio base station; and wherein transmitting the information associated with the neighboring node includes: transmitting location information associated with the NTN radio base station to the one or more terrestrial radio base stations that neighbor the NTN radio base station.

In another example, performing the one or more actions includes: transmitting the location information for the plurality of terrestrial radio base stations and the plurality of NTN radio base stations to a Radio Access Network (RAN) Footprint Coordinator (RCMFC) for maintaining a coverage map for terrestrial and non-terrestrial networks and determining navigation routes for drones. In another example, obtaining the location information includes obtaining the location information in response to transmitting a Next Generation Application Protocol (NGAP) message requesting the location information.

In another form, an apparatus is provided including: a memory for storing data; a network interface configured to enable network communications; and a processor for executing instructions associated with the data, wherein executing the instructions causes the apparatus to perform operations, including: obtaining location information for a plurality of terrestrial radio base stations and a plurality of non-terrestrial network (NTN) radio base stations; obtaining an indication of neighboring NTN radio base stations for each of the plurality of terrestrial radio base stations; storing an NTN neighbor list that includes the indication of the neighboring NTN radio base stations for each of the plurality of terrestrial radio base stations; and performing one or more actions with respect to the NTN neighbor list and the location information.

In yet another form, one or more non-transitory computer-readable storage media encoded with instructions are provided that, when executed by a processor, cause the processor to perform operations, including: obtaining location information for a plurality of terrestrial radio base stations and a plurality of non-terrestrial network (NTN) radio base stations; obtaining an indication of neighboring NTN radio base stations for each of the plurality of terrestrial radio base stations; storing an NTN neighbor list that includes the indication of the neighboring NTN radio base stations for each of the plurality of terrestrial radio base stations; and performing one or more actions with respect to the NTN neighbor list and the location information.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 1102.11 (e.g., Wi-Fi®/Wi-Fi6®), IEEE 1102.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining, at an Access and Mobility Management Function (AMF), location information for a plurality of terrestrial radio base stations and a plurality of non-terrestrial network (NTN) radio base stations;

obtaining, at the AMF, an indication of neighboring NTN radio base stations for each of the plurality of terrestrial radio base stations;

storing, at the AMF, an NTN neighbor list that includes the indication of the neighboring NTN radio base stations for each of the plurality of terrestrial radio base stations; and performing one or more actions with respect to the NTN neighbor list and the location information.

2. The method of claim 1, wherein storing the NTN neighbor list includes storing a plurality of NTN neighbor lists, each NTN neighbor list being associated with a tracking area identity (TAI) of a tracking area.

3. The method of claim 1, wherein performing the one or more actions comprises:

identifying, from the NTN neighbor list, information associated with a neighboring node of a network node; and transmitting the information associated with the neighboring node to provide adjustments in network coverage.

4. The method of claim 3, wherein identifying the information associated with the neighboring node of the network node comprises:

obtaining an indication of congestion at one or more terrestrial radio base stations of the plurality of terrestrial radio base stations; and identifying, from the NTN neighbor list, one or more neighboring NTN radio base stations for the one or more terrestrial radio base stations; and wherein transmitting the information associated with the neighboring node comprises:

transmitting information associated with the one or more terrestrial radio base stations to the one or more neighboring NTN radio base stations.

5. The method of claim 3, wherein identifying the information associated with the neighboring node of the network node comprises:

obtaining an indication of a service disruption at an NTN radio base station of the plurality of NTN radio base stations; and identifying, from the NTN neighbor list, one or more terrestrial radio base stations, of the plurality of terrestrial radio base stations, that neighbor the NTN radio base station; and wherein transmitting the information associated with the neighboring node comprises:

transmitting location information associated with the NTN radio base station to the one or more terrestrial radio base stations that neighbor the NTN radio base station.

6. The method of claim 1, wherein performing the one or more actions comprises:

transmitting the location information for the plurality of terrestrial radio base stations and the plurality of NTN radio base stations to a Radio Access Network (RAN) Footprint Coordinator (RCMFC) for maintaining a coverage map for terrestrial and non-terrestrial networks and determining navigation routes for drones.

7. The method of claim 1, wherein obtaining the location information includes obtaining the location information in response to transmitting a Next Generation Application Protocol (NGAP) message requesting the location information.

8. An apparatus comprising:

a memory for storing data;

a network interface configured to enable network communications; and a processor for executing instructions associated with the data, wherein executing the instructions causes the apparatus to perform operations, comprising:

obtaining location information for a plurality of terrestrial radio base stations and a plurality of non-terrestrial network (NTN) radio base stations;

obtaining an indication of neighboring NTN radio base stations for each of the plurality of terrestrial radio base stations;

storing an NTN neighbor list that includes the indication of the neighboring NTN radio base stations for each of the plurality of terrestrial radio base stations; and performing one or more actions with respect to the NTN neighbor list and the location information.

9. The apparatus of claim 8, wherein, when storing the NTN neighbor list, the processor executes the instructions to cause the apparatus to perform further operations comprising:

storing a plurality of NTN neighbor lists, each NTN neighbor list being associated with a tracking area identity (TAI) of a tracking area.

10. The apparatus of claim 8, wherein, when performing the one or more actions, the processor executes the instructions to cause the apparatus to perform further actions comprising:

identifying, from the NTN neighbor list, information associated with a neighboring node of a network node; and transmitting the information associated with the neighboring node to provide adjustments in network coverage.

11. The apparatus of claim 10, wherein, when identifying the information associated with the neighboring node of the network node, the processor executes the instructions to cause the apparatus to perform further actions comprising:

obtaining an indication of congestion at one or more terrestrial radio base stations of the plurality of terrestrial radio base stations; and identifying, from the NTN neighbor list, one or more neighboring NTN radio base stations for the one or more terrestrial radio base stations; and when transmitting the information associated with the neighboring node, the processor executes the instructions to cause the apparatus to perform further actions comprising:

transmitting information associated with the one or more terrestrial radio base stations to the one or more neighboring NTN radio base stations.

12. The apparatus of claim 10, wherein, when identifying the information associated with the neighboring node, the processor executes the instructions to cause the apparatus to perform further actions comprising:

obtaining an indication of a service disruption at an NTN radio base station of the plurality of NTN radio base stations; and identifying, from the NTN neighbor list, one or more terrestrial radio base stations, of the plurality of terrestrial radio base stations, that neighbor the NTN radio base station; and when transmitting the information associated with the neighboring node, the processor executes the instructions to cause the apparatus to perform further actions comprising:

transmitting location information associated with the NTN radio base station to the one or more terrestrial radio base stations that neighbor the NTN radio base station.

13. The apparatus of claim 8, wherein, when performing the one or more actions, the processor executes the instructions to cause the apparatus to perform further actions comprising:

transmitting the location information for the plurality of terrestrial radio base stations and the plurality of NTN radio base stations to a Radio Access Network (RAN) Footprint Coordinator (RCMFC) for maintaining a coverage map for terrestrial and non-terrestrial networks and determining navigation routes for drones.

14. The apparatus of claim 8, wherein, when obtaining the location information, the processor executes the instructions to cause the apparatus to perform further actions comprising:

obtaining the location information in response to transmitting a Next Generation Application Protocol (NGAP) message requesting the location information.

15. One or more non-transitory computer-readable storage media encoded with instructions that, when executed by a processor, cause the processor to perform operations, comprising:

obtaining location information for a plurality of terrestrial radio base stations and a plurality of non-terrestrial network (NTN) radio base stations;

obtaining an indication of neighboring NTN radio base stations for each of the plurality of terrestrial radio base stations;

storing an NTN neighbor list that includes the indication of the neighboring NTN radio base stations for each of the plurality of terrestrial radio base stations; and performing one or more actions with respect to the NTN neighbor list and the location information.

16. The one or more non-transitory computer-readable storage media of claim 15, wherein, when storing the NTN neighbor list, the processor executes the instructions to cause the processor to perform further operations comprising:

storing a plurality of NTN neighbor lists, each NTN neighbor list being associated with a tracking area identity (TAI) of a tracking area.

17. The one or more non-transitory computer-readable storage media of claim 15, wherein, when performing the one or more actions, the processor executes the instructions to cause the processor to perform further actions comprising:

identifying, from the NTN neighbor list, information associated with a neighboring node of a network node; and transmitting the information associated with the neighboring node to provide adjustments in network coverage.

18. The one or more non-transitory computer-readable storage media of claim 17, wherein, when identifying the information associated with the neighboring node, the processor executes the instructions to cause the processor to perform further actions comprising:

obtaining an indication of congestion at one or more terrestrial radio base stations of the plurality of terrestrial radio base stations; and identifying, from the NTN neighbor list, one or more neighboring NTN radio base stations for the one or more terrestrial radio base stations; and when transmitting the information associated with the neighboring node, the processor executes the instructions to cause the processor to perform further actions comprising:

transmitting information associated with the one or more terrestrial radio base stations to the one or more neighboring NTN radio base stations.

19. The one or more non-transitory computer-readable storage media of claim 17, wherein, when identifying the information associated with the neighboring node, the processor executes the instructions to cause the processor to perform further actions comprising:

obtaining an indication of a service disruption at an NTN radio base station of the plurality of NTN radio base stations; and identifying, from the NTN neighbor list, one or more terrestrial radio base stations, of the plurality of terrestrial radio base stations, that neighbor the NTN radio base station; and when transmitting the information associated with the neighboring node, the processor executes the instructions to cause the processor to perform further actions comprising:

transmitting location information associated with the NTN radio base station to the one or more terrestrial radio base stations that neighbor the NTN radio base station.

20. The one or more non-transitory computer-readable storage media of claim 15, wherein when performing the one or more actions, the processor executes the instructions to cause the processor to perform further actions comprising:

transmitting the location information for the plurality of terrestrial radio base stations and the plurality of NTN radio base stations to a Radio Access Network (RAN) Footprint Coordinator (RCMFC) for maintaining a coverage map for terrestrial and non-terrestrial networks and determining navigation routes for drones.

* * * * *